Patented Feb. 10, 1931

1,791,633

UNITED STATES PATENT OFFICE

ROBERT C. PALMER, OF PENSACOLA, FLORIDA, AND CLYDE O. HENKE, OF SOUTH MILWAUKEE, WISCONSIN, ASSIGNORS TO THE NEWPORT COMPANY, OF CARROLLVILLE, WISCONSIN, A CORPORATION OF DELAWARE

PROCESS OF PURIFYING AND DECOLORIZING ROSINS

No Drawing. Application filed December 24, 1927. Serial No. 242,517.

This invention relates to an improvement in the process of purifying and decolorizing rosin containing material by the use of resorcinol.

In the co-pending application of Ivan Gubelmann and Clyde O. Henke entitled: "A process of purifying and decoloring rosins with resorcinol", Serial No. 208,407 filed July 25, 1927, it has been shown that resorcinol has selective extractive properties towards the impurities contained in rosin, including both gum and wood. In that application, the resorcinol mass containing the impurities is removed as a solid at ordinary or lower temperatures.

The present invention constitutes certain improvements over the process disclosed in the Gubelmann and Henke application in that we have found that most of the resorcinol mass containing the coloring bodies may be removed in the liquid condition, while the mixture is still hot, the balance being removed during and after cooling.

It is therefore an object of this invention to provide an improved method of purifying and decolorizing rosins by means of resorcinol wherein low grade rosins may be converted into high grade rosins.

Other and further important objects of this invention will be apparent from the disclosures in the specification and the appended claims.

In general, our process comprises dissolving the rosin in a suitable solvent therefor and in treating the rosin solution thus formed with a relatively small quantity of resorcinol to extract rosin impurities and coloring matters. As is well known, wood rosins are prepared by extracting finely comminuted resinous woods with volatile hydrocarbon solvents, and this extraction mass as secured commercially may be used.

Without limiting our invention to any particular procedure, the following example, in which parts by weight are expressed, illustrates an embodiment of our preferred method.

In this example, we use a rosin solution as is commercially secured in the extraction of wood stock with petroleum naphtha. To 960 parts of this rosin solution, containing 100 parts rosin, at 90 to 110° C., are added, while stirring, 22.2 parts of molten resorcinol, preferably in the form of a 90% aqueous solution, and the mixture is then stirred for 20 minutes. Only a small part of the resorcinol is dissolved by the rosin solution. Most of it is in the form of a heavy dark colored liquid which contains most of the colored constituents. After stirring 20 minutes, the stirrer is stopped and the dark liquid very quickly settles to the bottom of the treating tank from which it is drawn off in the liquid condition. This is a molten mass consisting principally of resorcinol and the extracted colored bodies. After drawing off this mass, the stirrer is started and the mixture cooled to about 50° C. On cooling, more dark colored material separates from the solution, which again is a mass of resorcinol and color bodies. This mass which separates on cooling is allowed to settle to the bottom of the tank by stopping the stirrer, when it is drawn off in the fluid condition. After drawing off the dark fluid mass at 50° C., the stirring is continued and the cooling is carried down to about 30° C., when more of the mass containing resorcinol and color bodies separates and is drawn off.

At a temperature of about 30° C., the mass containing resorcinol and color bodies may solidify. This congealing point depends on the relative proportions of color bodies and resorcinol and on the percentage of water present, the water increasing the fluidity of the mass and lowering its congealing point. However, the above procedure permits the removal of nearly all of the resorcinol mass in a fluid condition, there being only a small amount near the end of the process which may congeal as a solid on the walls of the treating tank. The removal of nearly all of the resorcinol mass in a liquid state facilitates very materially the practical plant operation of the process.

The resulting rosin liquor is then washed with water to extract the resorcinol, after which it is evaporated and steamed down to recover the purified rosin. The yield of purified rosin is about 87 parts from the 100 parts of rosin started with, and is of I to M grade depending on operating conditions.

The extraction of the resorcinol mass with water leaves the color bodies, which constitute a dark rosin, rather insoluble in naphtha at room temperature but soluble in benzol. This dark rosin has certain uses in the trade.

We are aware that many changes may be made and numerous details of the process may be varied through a wide range without departing from the principles of this invention and we, therefore, do not purpose limiting the patent granted hereon, otherwise than necessitated by the prior art.

We claim as our invention:

1. In the process of purifying and decolorizing rosins, the steps which comprise treating rosin dissolved in a volatile hydrocarbon with resorcinol at a temperature at which the resorcinol is in liquid form and below the boiling point of the hydrocarbon, agitating, allowing the mass to stand to effect separation into layers and removing the liquid resorcinol layer containing impurities.

2. In the process of purifying and decolorizing rosins, the steps which comprise treating rosin dissolved in a volatile hydrocarbon in the liquid form with resorcinol at an elevated temperature while agitating, allowing the mass to stand to effect separation into layers, removing the liquid resorcinol layer containing impurities, cooling the remaining mass to further separate resorcinol containing dissolved impurities and removing the thus separated resorcinol portion.

3. In the process of purifying and decolorizing rosin, the steps which comprise treating rosin dissolved in petroleum naphtha with resorcinol at a temperature of approximately 90 to 110° C., agitating the mass to obtain thorough mixing, allowing the mass to stand while hot to effect separation of a resorcinol layer containing the impurities and removing said resorcinol layer.

4. In the process of purifying and decolorizing rosins, the steps which comprise treating rosin dissolved in a petroleum distillate with an aqueous solution of resorcinol at an elevated temperature, agitating the mass to obtain thorough intermixing, allowing the hot mass to stand to effect separation of a liquid resorcinol layer containing dissolved impurities and drawing off said liquid resorcinol layer.

5. In the process of purifying and decolorizing rosins, the steps which comprise treating rosin dissolved in a petroleum distillate with an approximately 90% aqueous solution of resorcinol at a temperature of approximately 90 to 110° C., agitating the mass to obtain thorough intermixing, allowing the hot mass to stand to effect separation of a liquid resorcinol layer containing dissolved impurities, drawing off said liquid resorcinol layer and successively cooling, agitating, settling and drawing off further quantities of resorcinol containing dissolved impurities.

6. In the process of purifying and decolorizing rosins, the steps which comprise treating rosin with resorcinol in the liquid phase and effecting a separation of the rosin from the resorcinol in the liquid phase.

7. In the process of purifying and decolorizing rosins, the steps which comprise treating rosin in solution with resorcinol in the liquid phase and effecting a separation of the rosin from the resorcinol in the liquid phase.

8. In the process of purifying and decolorizing rosins, the steps which comprise treating rosin in solution in petroleum naphtha with resorcinol in the liquid phase and effecting a separation of the rosin from the resorcinol in the liquid phase.

9. In the process of purifying and decolorizing rosins, the steps which comprise treating rosin in solution with resorcinol in the liquid phase at a temperature of from 90 to 110° C. and effecting a separation of the rosin from the resorcinol in the liquid phase.

10. In the process of purifying and decolorizing rosins, the steps which comprise treating rosin in solution in petroleum naphtha with resorcinol in the liquid phase at a temperature of from 90 to 110° C. and effecting a separation of the rosin from the resorcinol in the liquid phase.

In testimony whereof we have hereunto subscribed our names at Carrollville, Milwaukee County, Wisconsin.

ROBERT C. PALMER.
CLYDE O. HENKE.